(12) United States Patent
Miura et al.

(10) Patent No.: US 7,679,684 B2
(45) Date of Patent: Mar. 16, 2010

(54) WHITE BALANCE ADJUSTING DEVICE AND VIDEO DISPLAY DEVICE

(75) Inventors: Susumu Miura, Hokkaido (JP); Takahisa Hatano, Hokkaido (JP); Kosho Suzuki, Hokkaido (JP)

(73) Assignee: Panasonic Corporation, Osaka (JP)

( * ) Notice: Subject to any disclaimer, the term of this patent is extended or adjusted under 35 U.S.C. 154(b) by 891 days.

(21) Appl. No.: 10/597,768

(22) PCT Filed: Feb. 8, 2005

(86) PCT No.: PCT/JP2005/001838

§ 371 (c)(1),
(2), (4) Date: Aug. 7, 2006

(87) PCT Pub. No.: WO2005/076637

PCT Pub. Date: Aug. 18, 2005

(65) Prior Publication Data

US 2007/0126934 A1    Jun. 7, 2007

(30) Foreign Application Priority Data

Feb. 10, 2004    (JP)    ............................ 2004-033168

(51) Int. Cl.
  *H04N 9/64* (2006.01)
(52) U.S. Cl. ...................... 348/656; 348/655
(58) Field of Classification Search ......... 348/655–658, 348/674, 675, 223.1, 224.1, 225.1
  See application file for complete search history.

(56) References Cited

U.S. PATENT DOCUMENTS 5,315,378 A    5/1994    Satou et al.
5,442,408 A *  8/1995    Haruki et al. ............... 348/655
5,532,765 A    7/1996    Inoue et al.
5,589,879 A *  12/1996   Saito et al. ............... 348/223.1
6,160,581 A    12/2000   Higashihara et al.

(Continued)

FOREIGN PATENT DOCUMENTS

JP    55-025207    2/1980

(Continued)

OTHER PUBLICATIONS

English Language Abstract of JP 11-168655.

(Continued)

*Primary Examiner*—M. Lee
(74) *Attorney, Agent, or Firm*—Greenblum & Bernstein, P.L.C.

(57) ABSTRACT

During adjustment of a white balance, images having different white balances are displayed respectively on a plurality of regions on the screen 201 of the display 200, based on the red video signal Rout, the green video signal Gout and the blue video signal Bout output from the gamma correction device 30. After that, an user selects any of the plurality of regions by comparing the plurality of images having the different white balances displayed on the regions A to I on the screen 201 of the display 200 and pressing a touch panel on the screen 201. The image on the selected region is displayed on the entire screen 201 of the display 200, based on the red video signal Rout, the green video signal Gout and the blue video signal Bout output from the gamma correction device 30.

12 Claims, 5 Drawing Sheets

U.S. PATENT DOCUMENTS

| | | | |
|---|---|---|---|
| 6,683,616 | B1 | 1/2004 | Yamauchi et al. |
| 2003/0076312 | A1 | 4/2003 | Yokoyama |
| 2004/0174384 | A1 | 9/2004 | Ochiai et al. |

FOREIGN PATENT DOCUMENTS

| | | |
|---|---|---|
| JP | 55-041059 | 3/1980 |
| JP | 62-185489 | 8/1987 |
| JP | 4-298189 | 10/1992 |
| JP | 4-369155 | 12/1992 |
| JP | 5-127620 | 5/1993 |
| JP | 6-062423 | 3/1994 |
| JP | 6-217336 | 8/1994 |
| JP | 6-269015 | 9/1994 |
| JP | 6-311523 | 11/1994 |
| JP | 7-064522 | 3/1995 |
| JP | 7-184218 | 7/1995 |
| JP | 7-203256 | 8/1995 |
| JP | 8-265607 | 10/1996 |
| JP | 8-336155 | 12/1996 |
| JP | 9-294218 | 11/1997 |
| JP | 10-093854 | 4/1998 |
| JP | 10-145806 | 5/1998 |
| JP | 10-150620 | 6/1998 |
| JP | 11-102428 | 4/1999 |
| JP | 11-168655 | 6/1999 |
| JP | 2000-316173 | 11/2000 |
| JP | 2001-024975 | 1/2001 |
| JP | 2001-045527 | 2/2001 |
| JP | 2003-131654 | 5/2003 |
| JP | 2003-228330 | 8/2003 |
| JP | 2003-244721 | 8/2003 |
| JP | 2004-186927 | 7/2004 |

OTHER PUBLICATIONS

English Language Abstract of JP 9-294218.
English Language Abstract of JP 10-145806.
English Language Abstract of JP 11-102428.
English Language Abstract of JP 2003-131654.
English Language Abstract of JP 4-369155.
English Language Abstract of JP 10-150620.
English Language Abstract of JP 2001-045527.
English Language Abstract of JP 55-025207.
English Language Abstract of JP 2004-186927.
English Language Abstract of JP 2003-244721.
English Language Abstract of JP 55-041059.
English Language Abstract of JP 62-185489.
English Language Abstract of JP 4-298189.
English Language Abstract of JP 5-127620.
English Language Abstract of JP 6-062423.
English Language Abstract of JP 6-217336.
English Language Abstract of JP 6-269015.
English Language Abstract of JP 6-311523.
English Language Abstract of JP 7-064522.
English Language Abstract of JP 7-184218.
English Language Abstract of JP 7-203256.
English Language Abstract of JP 8-265607.
English Language Abstract of JP 8-336155.
English Language Abstract of JP 10-093854.
English Language Abstract of JP 2000-316173.
English Language Abstract of JP 2001-024975.
English Language Abstract of JP 2003-228330.

* cited by examiner

| SL1 \ SL2 | 0 | 1 | 2 |
|---|---|---|---|
| 0 | DR-A<br>DG-A<br>DB-A | DR-D<br>DG-D<br>DB-D | DR-G<br>DG-G<br>DB-G |
| 1 | DR-B<br>DG-B<br>DB-B | DR-E<br>DG-E<br>DB-E | DR-H<br>DG-H<br>DB-H |
| 2 | DR-C<br>DG-C<br>DB-C | DR-F<br>DG-F<br>DB-F | DR-I<br>DG-I<br>DB-I |

WHITE BALANCE ADJUSTING DEVICE AND VIDEO DISPLAY DEVICE

TECHNICAL FIELD

The present invention relates to a white balance adjusting device that adjusts a white balance of an image and a video display device with the same.

BACKGROUND ART

Generally, a white balance adjusting device is provided in a video display device such as a television receiver. In the video display device using a CRT (Cathode Ray Tube), gamma correction curves are separately set for an R-signal (red signal), a G-signal (green signal) and a B-signal (blue signal) for gamma correction.

When a user adjusts a white balance of the video display device, for example, the user displays an adjustment menu by OSD (On Screen Display) on a screen by an operation key on the front of the video display device. The user controls gains of R (red), G (green) and B (blue), respectively, in a user mode in the adjustment menu by the operation key to change the gamma correction curves set separately for the R-signal, the G-signal and the B-signal with the amounts of correction corresponding to the gains Thus, the white balance of the image on the entire screen is adjusted by controlling mutual balance among levels of the R-signal, the G-signal and the B-signal.

There is also a proposed method that a user adjusts a white balance by selecting any of color temperatures referred to as "9300K", "6500K" and "5800K" in letters in an adjustment menu by the OSD (refer to Patent Document 1).

[Patent Document 1] JP 55-25207 A

DISCLOSURE OF THE INVENTION

Problems to be Solved by the Invention

The aforementioned method of controlling the mutual balance among the levels of the R-signal, the G-signal and the B-signal takes time and techniques for adjusting. Moreover, since it is impossible to compare conditions of the image before and after the adjustment, it is difficult for the user to adjust the white balance of the image visually.

Furthermore, in the method of selecting a color temperature, it is impossible for the user to confirm a condition of the white balance of the image until the image is displayed after the color temperature is selected. In addition, the user can view only one white balance when the image is displayed by selecting the color temperature. This makes it difficult to judge whether or not the white balance of the image displayed is appropriate.

An object of the present invention is to provide the white balance adjusting device that easily and properly adjusts a white balance of an image displayed on a screen of a display and a video display device with the same.

Means for Solving the Problems

A white balance adjusting device according to one aspect of the present invention used for a display capable of displaying images respectively on a plurality of regions on a screen, for adjusting white balances of images displayed by first, second and third primary signals corresponding respectively to different colors includes a storage that stores a plurality of first correction data signals for gamma correction of the first primary signal, a plurality of second correction data signals for the gamma correction of the second primary signal and a plurality of third correction data signals for the gamma correction of the third primary signal, a first selector that selects any of the plurality of first correction data signals, any of the plurality of second correction data signals and any of the plurality of third correction data signals stored in the storage, a corrector that carries out the gamma correction of the input first, second and third primary signals using the first, second and third correction data signals selected by the first selector and an adjustment instruction device that gives an instruction to adjust the white balance, wherein the first selector selects a plurality of different combinations of the first, second and third correction data signals corresponding respectively to the plurality of regions on the screen of the display when the adjustment instruction device gives the instruction to adjust the white balance, the corrector corrects the input first, second and third primary signals using the plurality of different combinations of first, second and third correction data signals selected by the first selector, to display the images having different white balances on the plurality of regions, respectively.

In the white balance adjusting device, the plurality of first correction data signals, the plurality of second correction data signals and the plurality of third correction data signals are stored in the storage. A user gives the instruction to adjust the white balance by the adjustment instruction device, thereby selecting the plurality of different combinations of first, second and third correction data signals corresponding respectively to the plurality of regions on the screen of the display by the first selector and correcting the input first, second and third primary signals using the selected plurality of different combinations of first, second and third correction data signals. As a result, the images having the different white balances are displayed respectively on the plurality of regions on the screen of the display.

This enables the user to compare the plurality of images having the different white balances simultaneously while viewing. Accordingly, it is possible for the user to easily and correctly select the image having a white balance suitable for the user's preference among a plurality of white balances having subtle differences. Consequently, it is possible to easily and properly adjust the white balance of the image displayed on the screen of the display.

The white balance adjusting device may further include a second selector that selects any of the plurality of images displayed respectively on the plurality of regions on the screen of the display and a controller that controls the first selector such that one combination of the first, second and third correction data signals corresponding to the image selected by the second selector is selected, the corrector may correct the first, second and third primary signals to display the image on the entire screen of the display using the one combination of the first, second and third correction data signals selected by the first selector.

The user can select any of the plurality of images displayed respectively on the plurality of regions on the screen of the display by the second selector. In this case, the first selector is controlled by the controller such that one combination of the first, second and third correction data signals corresponding to the selected image is selected. Thus, the first, second and third primary signals are corrected using the selected one combination of the first, second and third correction data signals, and the image is displayed on the entire screen of the display based on the corrected first, second and third primary signals. As a result, it is possible to display the image having an appropriate white balance on the entire screen of the display.

The white balance adjusting device may further include a readjustment instruction device that gives an instruction to readjust the white balance after the adjustment thereof, the controller may control the first selector such that the image is displayed on the entire screen of the display with the white balance of the image that has been displayed on the entire screen of the display before the adjustment of the current white balance when the readjustment instruction device gives the instruction to readjust the white balance.

If the user gives the instruction to readjust the white balance using the readjustment instruction device after the adjustment of the white balance, the image is displayed on the entire screen of the display with the white balance of the image that has been displayed on the entire screen of the display before the adjustment of the current white balance. This enables the user to easily return the white balance of the image to the white balance before the adjustment.

The white balance adjusting device may further include a holder that holds the combination of the first, second and third correction data signals corresponding to the image that has been displayed on the entire screen of the display before the adjustment of the white balance, the controller may control the first selector such that the combination of the first, second and third correction data signals held by the holder is selected when the readjustment is instructed by the readjustment instruction device.

In this case, the combination of the first, second and third correction data signals corresponding to the image displayed on the entire screen of the display before the adjustment of the white balance is held by the holder. If the user gives the instruction to read just using the readjustment instruction device, the held combination of the first, second and third correction data signals is selected. Thus, the image is reliably displayed on the entire screen of the display with the white balance of the image that has been displayed on the entire screen of the display before the adjustment of the current white balance.

The second selector may include a touch panel provided on the screen of the display. This enables the user to easily and correctly select the image having the white balance suitable for the user's preference among a plurality of white balances having subtle differences by just touching the touch panel.

A video display device according to another aspect of the present invention includes a display having a screen, a signal processor that generates first, second and third primary signals corresponding respectively to different colors to display an image on the screen of the display and a white balance adjusting device that adjusts a white balance of the image displayed on the screen of the display, the white balance adjusting device includes a storage that stores a plurality of first correction data signals for gamma correction of the first primary signal, a plurality of second correction data signals for the gamma correction of the second primary signal and a plurality of third correction data signals for the gamma correction of the third primary signal, a first selector that selects any of the plurality of first correction data signals, any of the plurality of second correction data signals and any of the plurality of third correction data signals stored in the storage, a corrector that carries out the gamma correction of the first, second and third primary signals generated by the signal processor using the first, second and third correction data signals selected by the first selector and an adjustment instruction device that gives an instruction to adjust the white balance, wherein the first selector selects a plurality of different combinations of the first, second and third correction data signals corresponding respectively to a plurality of regions on the screen of the display when the adjustment instruction device gives the instruction to adjust the white balance, the corrector corrects the first, second and third primary signals generated by the signal processor using the plurality of different combinations of the first, second and third correction data signals selected by the first selector, the display displays the images having different white balances on the plurality of regions, respectively, based on the first, second and third correction data signals corrected by the corrector.

In the video display device, the first, second and third primary signals corresponding respectively to the different colors are generated by the signal processor and the image is displayed on the screen of the display based on the first, second and third primary signals. In addition, the white balance of the image displayed on the screen of the display is adjusted by the white balance adjusting device.

In the white balance adjusting device, the plurality of first correction data signals, the plurality of second correction data signals and the plurality of third correction data signals are stored in the storage. A user gives the instruction to adjust the white balance by the adjustment instruction device, thereby selecting the plurality of different combinations of first, second and third correction data signals corresponding respectively to the plurality of regions on the screen of the display by the first selector and correcting the input first, second and third primary signals using the selected plurality of different combinations of first, second and third correction data signals. As a result, the images having the different white balances are displayed respectively on the plurality of regions on the screen of the display.

This enables the user to compare the plurality of images having the different white balances simultaneously while viewing. Accordingly, it is possible for the user to easily and correctly select the image having a white balance suitable for the user's preference among a plurality of white balances having subtle differences. Consequently, it is possible to easily and properly adjust the white balance of the image displayed on the screen of the display.

The white balance adjusting device may further include a second selector that selects any of the plurality of images displayed respectively on the plurality of regions on the screen of the display and a controller that controls the first selector such that one combination of the first, second and third correction data signals corresponding to the image selected by the second selector is selected, wherein the corrector may correct the first, second and third primary signals generated by the signal processor using the one combination of the first, second and third correction data signals selected by the first selector, and the display may display the image on the entire screen based on the first, second and third primary signals corrected by the corrector.

The user can select any of the plurality of images displayed respectively on the plurality of regions on the screen of the display by the second selector. In this case, the first selector is controlled by the controller such that the one combination of the first, second and third correction data signals corresponding to the selected image is selected. Thus, the first, second and third primary signals are corrected using the selected one combination of the first, second and third correction data signals, and the image is displayed on the entire screen of the display based on the corrected first, second and third primary signals. As a result, it is possible to display the image having an appropriate white balance on the entire screen of the display.

The white balance adjusting device may further include a readjustment instruction device that gives an instruction to readjust the white balance after the adjustment thereof, the controller may control the first selector such that the image is displayed on the entire screen of the display with the white balance of the image that has been displayed on the entire screen of the display before the adjustment of the current white balance when the readjustment instruction device gives the instruction to readjust the white balance.

If the user gives the instruction to readjust the white balance using the readjustment instruction device after the adjustment of the white balance, the image is displayed on the entire screen of the display with the white balance of the image that has been displayed on the entire screen of the display before the adjustment of the current white balance. This enables the user to easily return the white balance of the image to the white balance before the adjustment.

The white balance adjusting device may further include a holder that holds the combination of the first, second and third correction data signals corresponding to the image that has been displayed on the entire screen of the display before the adjustment of the white balance, the controller may control the first selector such that the combination of the first, second and third correction data signals held by the holder is selected when the readjustment is instructed by the readjustment instruction device.

In this case, the combination of the first, second and third correction data signals corresponding to the image displayed on the entire screen of the display before the adjustment of the white balance is held by the holder. If the user gives the instruction to readjust using the readjustment instruction device, the held combination of the first, second and third correction data signals is selected. Thus, the image is reliably displayed on the entire screen of the display with the white balance of the image that has been displayed on the entire screen of the display before the adjustment of the white balance.

The second selector may include a touch panel provided on the screen of the display. This enables the user to easily and correctly select the image having the white balance suitable for the user's preference among the plurality of white balances having subtle differences by just touching the touch panel.

The signal processor may generate the first, second and third primary signals such that the images with same shapes are displayed on the plurality of regions on the screen of the display when the adjustment instruction device gives the instruction to adjust the white balance.

In this case, if the user gives the instruction to adjust the white balance by the adjustment instruction device, the images having the same shape and the different white balances are displayed on the screen of the display. This makes it possible to more correctly select the image having an appropriate white balance among a plurality of white balances having subtle differences.

The video display device may further include a synchronizing signal generator that generates a vertical synchronizing signal and a horizontal synchronizing signal, the first selector may include a selecting signal generator that generates a selecting signal for selecting the plurality of regions on the screen of the display in order based on the vertical synchronizing signal and the horizontal synchronizing signal generated by the synchronizing signal generator and a data selector that selects the plurality of different combinations of the first, second and third correction data signals corresponding respectively to the plurality of regions on the screen of the display in order based on the selecting signal generated by the selecting signal generator.

In this case, while the selecting signal for selecting the plurality of regions on the screen of the display in order based on the vertical synchronizing signal and the horizontal synchronizing signal is generated, the plurality of different combinations of the first, second and third correction data signals corresponding respectively to the plurality of regions on the screen of the display are selected in order based on the selecting signal. Thus, the images having different white balances are displayed respectively on the plurality of regions on the screen of the display.

Effects of the Invention

According to the present invention, the images having different white balances are displayed respectively on the plurality of regions on the screen of the display. This enables the user to compare the plurality of images having the different white balances simultaneously while viewing. Accordingly, it is possible for the user to easily and correctly select the image having a white balance suitable for the user's preference among white balances having subtle differences. As a result, it is possible to easily and properly adjust the white balance of the image displayed on the screen of the display.

BRIEF DESCRIPTION OF THE DRAWINGS

BEST MODE FOR CARRYING OUT THE INVENTION (1) Configuration of Video Display Device

Figure 1:
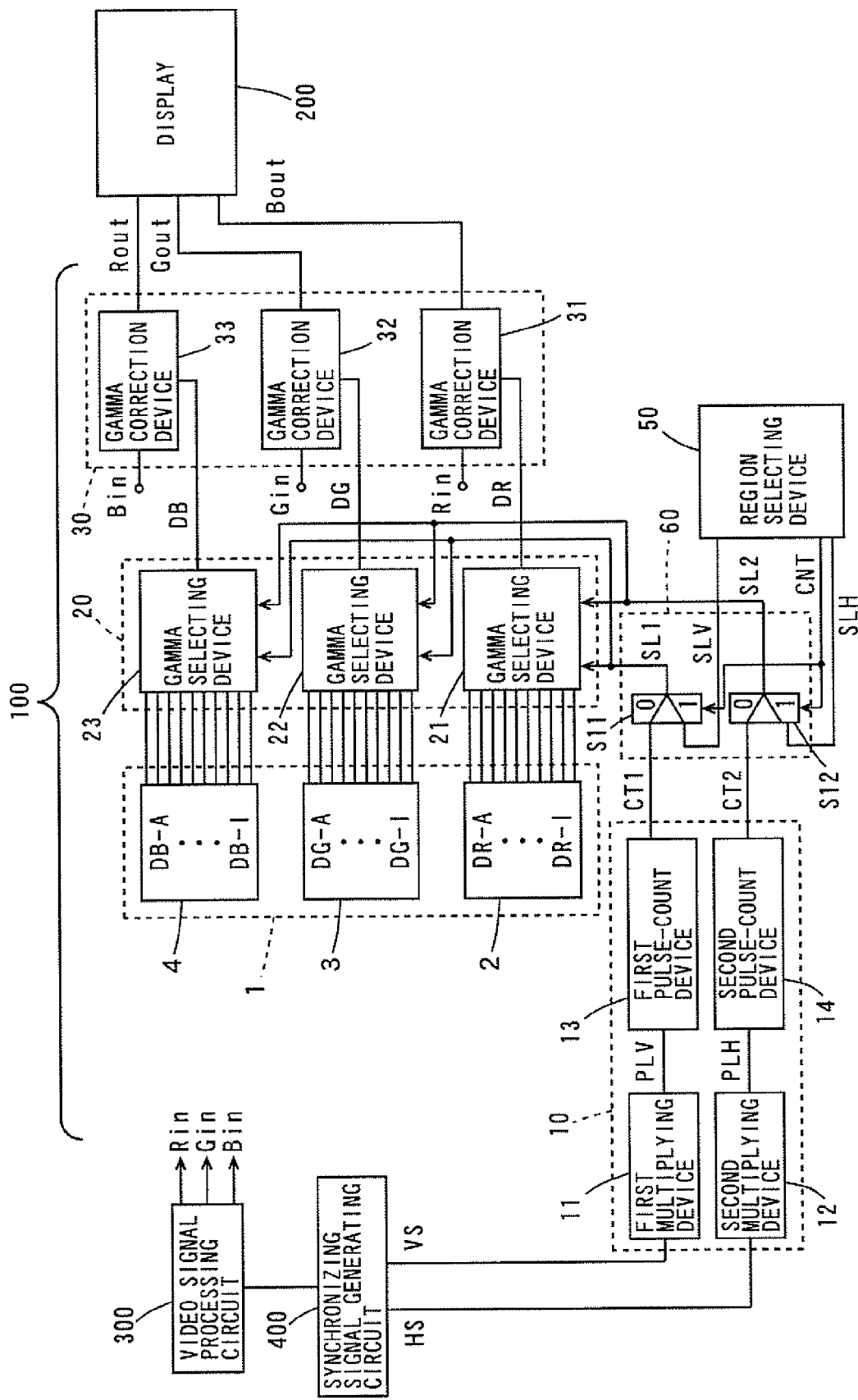
FIG. 1 is a block diagram showing the configuration of a video display device with a white balance adjusting device according to an embodiment of the present invention.

The video display device in FIG. 1 includes a white balance adjusting device 100, a display 200, a video signal processing circuit 300 and a synchronizing signal generating circuit 400.

The video signal processing circuit 300 outputs a red video signal Rin, a green video signal Gin and a blue video signal Bin by processing a video signal. Here, the video signal processing circuit 300 processes the red video signal Rin, the green video signal Gin and the blue video signal Bin such that the image is displayed on the entire screen of the display 200 during ordinary viewing, and processes the red video signal Rin, the green video signal Gin and the blue video signal Bin such that the images with the same shape are displayed respectively on a plurality of regions on the display 200 during adjustment of a white balance.

The synchronizing signal generating circuit 400 generates a vertical synchronizing signal VS and a horizontal synchronizing signal HS based on the video signals provided by the video signal processing circuit 300.

The white balance adjusting device 100 includes a gamma data storage device 1, a display screen dividing device 10, a correction amount selecting device 20, a gamma correction device 30, a region selecting device 50 and a correction amount fixing device 60.

The gamma data storage device 1 includes a gamma memory device 2 corresponding to the red video signal Rin, a gamma memory device 3 corresponding to the green video signal Gin and a gamma memory device 4 corresponding to the blue video signal Bin.

The gamma memory device 2 stores nine sets of gamma correction data signals DR-A to DR-I corresponding to nine types of gamma correction curves for the red video signal Rin. The gamma memory device 3 stores nine sets of gamma correction data signals DG-A to DG-I corresponding to nine types of gamma correction curves for the green video signal Gin. The gamma memory device 4 stores nine sets of gamma correction data signals DB-A to DB-I corresponding to nine types of gamma correction curves for the blue video signal Bin.

Each of the gamma correction data signals DR-A to DR-I includes a plurality of coefficients corresponding to a plurality of luminance levels represented by the red video signal Rin. Similarly, each of the gamma correction data signals DG-A to DG-I includes a plurality of coefficients corresponding to a plurality of luminance levels represented by the green video signal Gin. Moreover, each of the gamma correction data signals DB-A to DB-I includes a plurality of coefficients corresponding to a plurality of luminance levels represented by the blue video signal Bin.

The correction amount selecting device 20 includes a gamma selecting device 21 for the red video signal Rin, a gamma selecting device 22 for the green video signal Gin and a gamma selecting device 23 for the blue video signal Bin.

Figure 2:
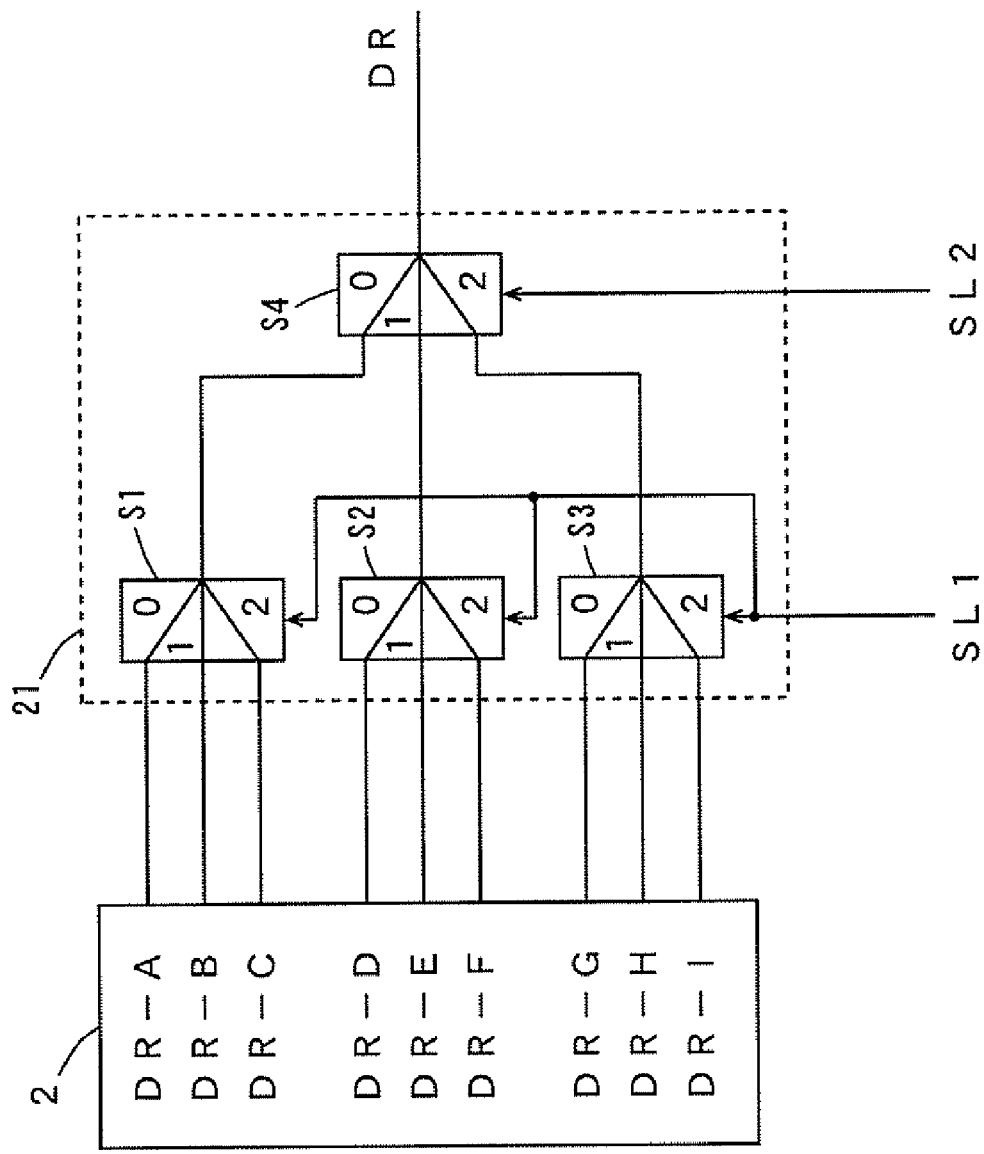
FIG. 2 is a block diagram showing the detailed configuration of a portion of a correction amount selecting device in FIG. 1.

As shown in FIG. 2, the gamma selecting device 21 includes three selectors S1, S2, S3 in the first stage and one selector S4 in the second stage.

The selector S1 has three input terminals that receive the gamma correction data signals DR-A to DR-C read out of the gamma memory device 2 and one output terminal. The selector S2 has three input terminals that receive the gamma correction data signals DR-D to DR-F read out of the gamma memory device 2 and one output terminal. The selector S3 has three input terminals that receive the gamma correction data signals DR-G to DR-I read out of the gamma memory device 2 and one output terminal.

The selector S4 has three input terminals that are connected to the output terminals of the selectors S1 to S3, respectively, and one output terminal.

The gamma selecting device 22 in FIG. 1, similarly to the gamma selecting device 21, includes three selectors in the first stage and one selector in the second stage. The three selectors in the first stage of the gamma selecting device 22 receive the gamma correction data signals DG-A to DG-I read out of the gamma memory device 3. The configuration of the gamma selecting device 22 is similar to that of the gamma selecting device 21.

The gamma selecting device 23 in FIG. 1, similarly to the gamma selecting device 21, includes three selectors in the first stage and one selector in the second stage. The three selectors in the first stage of the gamma selecting device 23 receive the gamma correction data signals DB-A to DB-I read out of the gamma memory device 4. The configuration of the gamma selecting device 23 is similar to that of the gamma selecting device 21.

The display screen dividing device 10 includes a first multiplying device 11, a second multiplying device 12, a first pulse-count device 13 and a second pulse-count device 14.

The first multiplying device 11 triplicates the vertical synchronizing signal VS generated by the synchronizing signal generating circuit 400 to output a first pulse signal PLV. The second multiplying device 12 triplicates the horizontal synchronizing signal HS generated by the synchronizing signal generating circuit 400 to output a second pulse signal PLH.

The first pulse-count device 13 counts pulses of the first pulse signal PLV output from the first multiplying device 11 to output a two-bit first count signal CT1. The second pulse-count device 14 counts the pulses of the second pulse signal PLH output from the second multiplying device 12 to output a two-bit second count signal CT2.

The region selecting device 50 includes a touch panel provided on the screen of the display 200, a remote controller, a CPU (Central Processing Unit) and a storage device such as a memory. This region selecting device 50 outputs a two-bit vertical region selecting signal SLV, a two-bit horizontal region selecting signal SLH and a one-bit control signal CNT. The value of the control signal CNT is changed to "0" or "1" by an operation of the remote controller by the user. The value of the control signal CNT is set to "0" during the adjustment of the white balance, and the value of the control signal CNT is set to "1" during the ordinary viewing.

The correction amount fixing device 60 includes two selectors S11, S12. The selector S11 has two input terminals that receive the first count signal CT1 output from the first pulse-count device 13 of the display screen dividing device 10 and the vertical regions electing signal SLV output from the region selecting device 50, respectively, and one output terminal. The selector S12 has two input terminals that receive the second count signal CT2 output from the second pulse-count device 14 of the display screen dividing device 10 and the horizontal region selecting signal SLH output from the region selecting device 50, respectively, and one output terminal.

The selector 11 outputs one of the first count signal CT1 and the vertical region selecting signal SLV as a first selecting signal SL1 in response to the control signal CNT. The selector S12 outputs one of the second count signal CT2 and the horizontal region selecting signal SLH as a second selecting signal SL2 in response to the control signal CNT.

Each of the selectors S1 to S3 in the gamma selecting device 21 in FIG. 2 selectively outputs any of the gamma correction data signals at the three input terminals in response to the first selecting signal SL1 output from the selector S11. The selector S4 selectively outputs any of the gamma correction data signals at the three input terminals in response to the second selecting signal SL2 output from the selector S12. Thus, the gamma selecting device 21 outputs any of the gamma correction data signals DR-A to DR-I as gamma correction data signals DR.

Similarly, the gamma selecting device 22 in FIG. 1 outputs any of the gamma correction data signals DG-A to DG-I as gamma correction data signals DG in response to the first selecting signal SL1 output from the selector S11 and the second selecting signal SL2 output from the selector S12.

Furthermore, the gamma selecting device 23 in FIG. 1 outputs any of the gamma correction data signals DB-A to DB-I in response to the first selecting signal SL1 output from the selector S11 and the second selecting signal SL2 output from the selector S12.

The gamma correction device 30 includes a gamma correction device 31 for the red video signal Rin, a gamma correction device 32 for the green video signal Gin and a gamma correction device 33 for the blue video signal Bin.

The red video signal Rin output from the video signal processing circuit 300 is input to the gamma correction device 31. The green video signal Gin output from the video signal processing circuit 300 is input to the gamma correction device 32. The blue video signal Bin output from the video signal processing circuit 300 is input to the gamma correction device 33.

The gamma correction device 31 applies gamma correction to the input red video signal Rin using the gamma correction data signal DR output from the gamma selecting device 21 to output a corrected red video signal Rout. In this case, the gamma correction device 31 extracts the coefficient corresponding to the luminance level of the red video signal Rin from the gamma correction data signal DR to correct the luminance level of the red video signal Rin using the extracted coefficient.

The gamma correction device 32 applies the gamma correction to the input green video signal Gin using the gamma correction data signal DG output from the gamma selecting device 22 to output a corrected green video signal Gout. In this case, the gamma correction device 32 extracts the coefficient corresponding to the luminance level of the green video signal Gin from the gamma correction data signal DG to correct the luminance level of the green video signal Gin using the extracted coefficient.

The gamma correction device 33 applies the gamma correction to the input blue video signal Bin using the gamma correction data signal DB output from the gamma selecting device 23 to output a corrected blue video signal Bout. In this case, the gamma correction device 33 extracts the coefficient corresponding to the luminance level of the blue video signal Bin from the gamma correction data signal DG to correct the luminance level of the blue video signal Bin using the extracted coefficient.

The display 200 includes a CRT (Cathode Ray Tube) or the like, and displays the image on the screen based on the red video signal Rout, the green video signal Gout and the blue video signal Bout output from the gamma correction device 30.

(2) Operation of White Balance Adjusting Device

Figure 3:
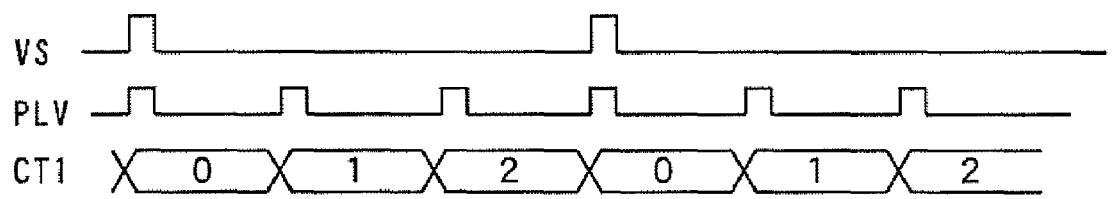
FIG. 3 is a timing chart showing the operation of a first multiplying device and a first pulse-count device of a display screen dividing device.
Figure 4:
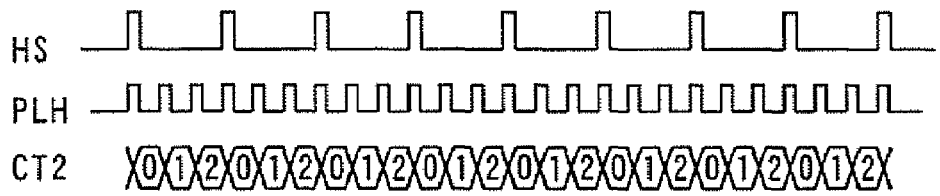
FIG. 4 is a timing chart showing the operation of a second multiplying device and a second pulse-count device of the display screen dividing device.

FIG. 3 is a timing chart showing the operation of a first multiplying device 1 and a first pulse-count device 13 of a display screen dividing device 10, and FIG. 4 is a timing chart showing the operation of a second multiplying device 12 and a second pulse-count device 14 of the display screen dividing device 10.

The vertical synchronizing signal VS, the first pulse signal PLV and the first count signal CT1 are shown in FIG. 3. In addition, the horizontal synchronizing signal HS, the second pulse signal PLH and the second count signal CT2 are shown in FIG. 4.

Note that, in the count signal CT1 of FIG. 3 and the second count signal CT2 of FIG. 4, binary values represented respectively by two bits are expressed in decimal values. Furthermore, in FIG. 4, an enlarged time base of each signal is drawn compared with the time base of each signal in FIG. 2.

As shown in FIG. 3, the first pulse signal PLV output from the first multiplying device 11 has a frequency three times the frequency of the vertical synchronizing signal VS. Thus, the value of the first count signal CT1 output from the first pulse-count device 13 is changed to "0", "1" and "2" in this order.

As shown in FIG. 4, the second pulse signal PLH output from the second multiplying device 12 has a frequency three times the frequency of the horizontal synchronizing signal HS. Thus, the value of the second count signal CT2 output from the second pulse-count device 14 is changed to "0", "1" and "2" in this order.

Figures 5, 6:
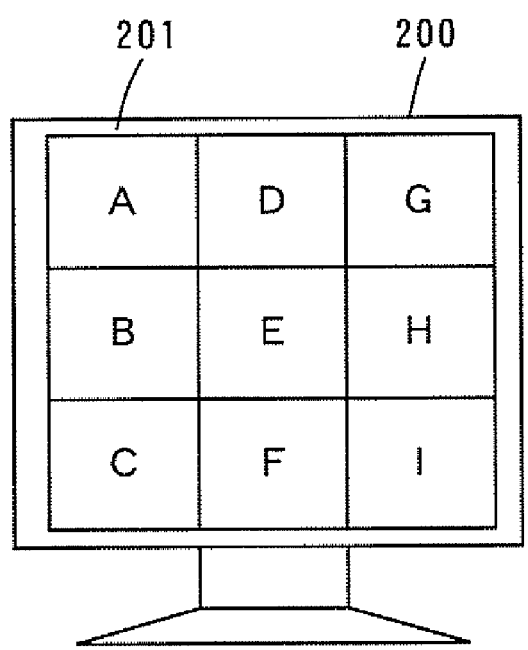
FIG. 5 is a diagram showing a correspondence table that indicates the correspondence between values of first and second selecting signals output from a correction amount fixing device during adjustment of a white balance and gamma correction data signals.
FIG. 6 is a diagram showing a screen of a display during the adjustment of the white balance.

FIG. 5 is a diagram showing a correspondence table that indicates the correspondence between values of first and second selecting signals SL1, SL2 output from a correction amount fixing device 60 during adjustment of a white balance and gamma correction data signals DR-A to DR-I, DG-A to DG-I, DB-A to DB-I.

The region selecting device 50 sets the value of the control signal CNT to "0" during the adjustment of the white balance. This causes the selector S11 to provide the gamma selecting devices 21, 22, 23 with the first count signal CT1 output from the first pulse-count device 13 as the first selecting signal SL1. In addition, the selector S12 provides the gamma selecting devices 21, 22, 23 with the second count signal CT2 output from the second pulse-count device 14 as the second selecting signal SL2.

In this case, the gamma selecting device 21 outputs the gamma correction data signals DR-A, DR-D, DR-G, DR-B, DR-E, DR-H, DR-C, DR-F, DR-I in this order.

Similarly, the gamma selecting device 22 outputs the gamma correction data signals DG-A, DG-D, DG-G, DG-B, DC-E, DG-H, DG-C, DG-F, DG-I in this order.

Furthermore, the gamma selecting device 23 outputs the gamma correction data signals DB-A, DB-D, DB-G, DB-B, DB-E, DB-H, DB-C, DB-F, DB-I in this order.

FIG. 6 is a diagram showing a screen of a display 200 during the adjustment of the white balance.

As shown in FIG. 6, a screen 201 of the display 200 is divided into three in a vertical direction and divided into three in a horizontal direction. This causes the screen 201 to be divided into nine regions A to I. Nine types of images to which the gamma correction was applied using the gamma correction data signals DR-A to DR-I, DG-A to DG-I, DB-R to DB-I are displayed on the regions A to I. Thus, these images have the different white balances.

The user selects any of the nine regions A to I on the screen 201 by pressing the touch panel provided on the screen 201 of the display 200. This causes the region selecting device 50 in FIG. 1 to set the value of the control signal CNT to "1". Moreover, the region selecting device 50 sets the values of the vertical region selecting signal SLV and the horizontal region selecting signal SLH corresponding to the region selected by the user.

For example, when the user selects the region F, the value of the vertical region selecting signal SLV is set to "2" and the value of the horizontal region selecting signal SLH is set to "1". The set values of the vertical region selecting signal SLV and the horizontal region selecting signal SLH are stored in a storage device of the region selecting device 50.

The values of the vertical region selecting signal SLV and the horizontal region selecting signal SLH before the adjustment of the white balance are also stored in the storage device of the region selecting device 50.

The selector S11 in the correction amount fixing device 60 provides the gamma selecting devices 21, 22, 23 with the vertical region selecting signal SLV output from the region selecting device 50 as the first selecting signal SL1. In addition, the selector S12 in the correction amount fixing device 60 provides the gamma selecting devices 21, 22, 23 with the horizontal region selecting signal SLH output from the region selecting device 50 as the second selecting signal SL2.

In this case, based on the first selecting signal SL1 and the second selecting signal SL2, the gamma selecting device 21 selectively outputs any of the gamma correction data signals DR-A to DR-I, the gamma selecting device 22 selectively outputs any of the gamma correction data signals DG-A to DG-I, and the gamma selecting device 23 selectively outputs any of the gamma correction data signals DB-A to DB-I.

As a result, the image on the region selected by the user among the nine regions A to I is displayed on the entire screen 201.

In such a way, during the adjustment of the white balance, the plurality of images to which the gamma correction was applied using the different gamma correction data signals are displayed simultaneously on the nine regions A to I on the screen 201 of the display 200. This enables the user to compare the plurality of images having different white balances simultaneously while viewing. Accordingly, it is possible for the user to easily and correctly select the image having a white balance suitable for the user's preference among the plurality of white balances having subtle differences. This makes it possible to display the image on the screen 201 of the display 200 with the white balance which is appropriately adjusted.

(3) Flow of the Operation of the Video Display Device

Figure 7:
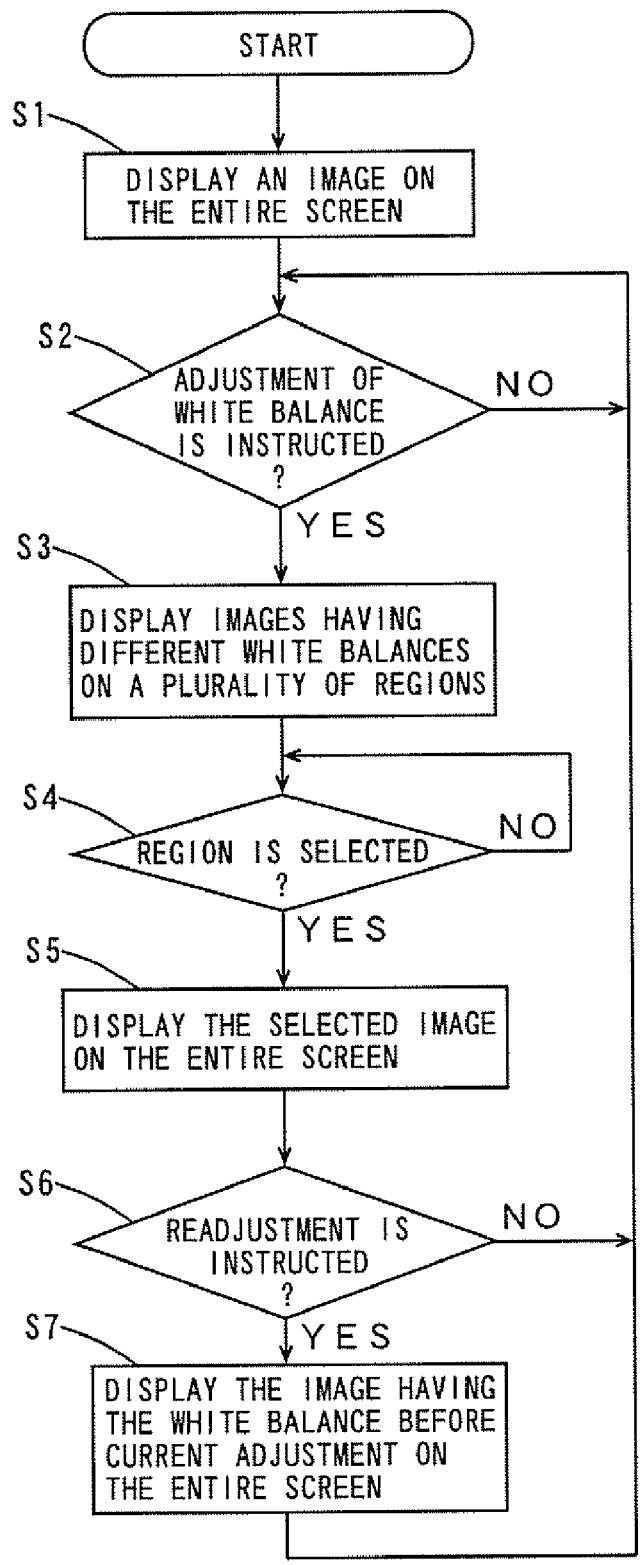
FIG. 7 is a flowchart showing a flow of the operation of the video display device in FIG. 1.

FIG. 7 is a flow chart showing a flow of the operation of the video display device in FIG. 1.

During the ordinary viewing, the region selecting device 50 sets the value of the control signal CNT to "1". In addition, the region selecting device 50 sets the values of the vertical region selecting signal SLV and the horizontal region selecting signal SLH to the values stored in the storage device. Thus, based on the red video signal Rout, the green video signal Gout and the blue video signal Bout output from the gamma correction device 30, the image is displayed on the entire screen 201 of the display 200 (Step S1).

During the adjustment of the white balance, the user gives the instruction to adjust the white balance using the remote controller. The CPU of the region selecting device 50 determines whether or not the instruction to adjust the white balance is given by the user (Step S2).

When the instruction to adjust the white balance is given, the region selecting device 50 sets the value of the control signal CNT to "0". Thus, based on the red video signal Rout, the green video signal Gout and the blue video signal Bout output from the gamma correction device 30, the images having different white balances are displayed respectively on the plurality of regions on the screen 201 of the display 200. In this embodiment of the present invention, the images having the different white balances are displayed respectively on the nine regions A to I on the screen 201 of the display 200 (Step S3).

After that, the user compares the plurality of images having the different white balances displayed on the regions A to I on the screen 201 of the display 200, and selects any of the regions A to I by pressing the touch panel on the screen 201.

The CPU of the region selecting device 50 determines whether or not any of the regions A to I is selected by the user (Step S4).

When any of the regions A to I is not selected by the user, the region selecting device 50 stands by. When any of the regions A to I is selected by the user, the region selecting device 50 sets the value of the control signal CNT to "1". Furthermore, the region selecting device 50 sets the values of the vertical region selecting signal SLV and the horizontal region selecting signal SLH to the values corresponding to the region selected by the user. Thus, based on the red video signal Rout, the green video signal Gout and the blue video signal Bout output from the gamma correction device 30, the image is displayed on the entire screen 201 of the display 200 (Step S5). In this case, the region selecting device 50 stores in the storage device the values of the vertical region selecting signal SLV and the horizontal region selecting signal SLH corresponding to the region selected by the user in the storage device.

The user gives the instruction to readjust the white balance using the remote controller when the user wishes to readjust the white balance. The CPU of the region selecting device 50 determines whether or not the instruction to readjust the white balance is given by the user (Step S6).

When the instruction to readjust the white balance is given, the region selecting device 50 sets the value of the control signal CNT to "0". In addition, the region selecting device 50 sets the values of the vertical region selecting signal SLV and the horizontal region selecting signal SLH to the values before the current adjustment of the white balance, based on the values stored in the storage device. Thus, based on the red video signal Rout, the green video signal Gout and the blue vide signal Bout output from the gamma correction device 30, the image having the white balance before the current adjustment is displayed on the entire screen 201 of the display 200 (Step S7).

After that, returning to the step S2, the processing of the steps S2 to S7 is implemented repeatedly. When the instruction to adjust the white balance is not given in the step S2 and when the instruction to readjust the white balance is not given in the step S6, the step S2 is implemented again.

In this way, when the readjustment is carried out after the adjustment of the white balance, the image having the white balance before the adjustment is displayed on the entire screen 201 of the display 200. This enables the user to easily return the white balance of the image in the condition before the adjustment.

(4) Correspondence Between Elements in Claims and Units in Embodiments

In the above-described embodiment, the display 200 corresponds to a display, the gamma data storage device 1 corresponds to a storage, the display screen dividing device 10, the correction amount selecting device 20 and the correction amount fixing device 60 correspond to a first selector, the gamma correction device 30 corresponds to a corrector, the region selecting device 50 corresponds to an adjustment instruction device, a readjustment instruction device, a second selector, a controller and a holder. In particular, the remote controller of the region selecting device 50 corresponds to the adjustment instruction device and the readjustment instruction device, the touch panel of the region selecting device 50 corresponds to the second selector, the CPU of the region selecting device 50 corresponds to the controller, and the storage device of the region selecting device 50 corresponds to the holder.

Furthermore, the video signal processing circuit 300 corresponds to a signal processor and the synchronizing signal generating circuit 400 corresponds to a synchronizing signal generator. In addition, the display screen dividing circuit 10 corresponds to a selecting signal generator and the correction amount selecting device 20 corresponds to a data selector.

Moreover, the red video signal Rin, the green video signal Gin and the blue video signal Bin correspond to a first primary signal, a second primary signal and a third primary signal. The gamma correction data signals DR-A to DR-I, the gamma correction data signals DG-A to DG-I and the gamma correction data signals DB-A to DB-I correspond to first correction data signals, second correction data signals and third correction data signals.

(5) Other Embodiments

Although the screen 201 of the display 200 is divided into three vertically and horizontally, thereby dividing the screen 201 into the nine regions A to I in the above-described embodiment, not limited to this, the screen 201 may be divided into any number of regions.

A variety of displays such as a liquid crystal display panel, a plasma display panel and the like can be used as a display instead of the display 200 composed of the CRT.

A single storage device may be used as a storage instead of the gamma memory device 3 composed of the three gamma memory devices 2, 3, 4. In addition, as the storage, a variety of semiconductor memories such as a nonvolatile memory, an ROM (Read Only Memory) and the like, and a variety of storage devices such as an optical medium, a magnetic recording medium, a magneto-optical medium and the like may be used.

A variety of selecting circuits composed of a plurality of switches and logic circuits may be used as the first selector instead of the display screen dividing device 10, the correction amount selecting device 20 and the correction amount fixing device 60.

A look-up-table composed of a storage device or an arithmetic unit may be used as the corrector instead of the gamma correction device 30.

A switch may be provided on the display 200 as the adjustment instruction device and the readjustment instruction device instead of the remote controller.

Other operating devices such as the remote controller having a plurality of keys and the like may be used as the second selector instead of the touch panel.

A variety of processing units such as an MPU (Micro Processing Unit) and the like may be used as the controller instead of the CPU. A variety of semiconductor memories such as a nonvolatile memory, an ROM (Read Only Memory) and the like and a variety of storage devices such as an optical medium, a magnetic recording medium, a magneto-optical medium and the like can be used as the holder.

A signal processing circuit that outputs other primary signals may be used as the signal processor instead of the video signal processing circuit 300.

Other logic circuits may be used as the selecting signal generator instead of the display screen dividing device 10. A variety of selecting circuits composed of a plurality of switches and logic circuits may be used as the data selector instead of the correction amount selecting device 20.

Although the images with the same shape are displayed on the plurality of regions on the screen 201 of the display 200 during the adjustment of the white balance in the above-described embodiment, images with different shapes may be displayed on the plurality of regions on the screen 201 of the display 200 during the adjustment of the white balance.

INDUSTRIAL APPLICABILITY

The present invention is applicable to adjustment of white balances of images displayed on various video display devices.

The invention claimed is:

1. A white balance adjusting device used for a display capable of displaying images respectively on a plurality of regions on a screen, for adjusting white balances of images displayed by first, second and third primary signals corresponding respectively to different colors, comprising:

a storage that stores a plurality of first correction data signals for gamma correction of the first primary signal, a plurality of second correction data signals for the gamma correction of the second primary signal and a plurality of third correction data signals for the gamma correction of the third primary signal;

a first selector that selects any of the plurality of first correction data signals, any of the plurality of second correction data signals and any of the plurality of third correction data signals stored in said storage;

a corrector that carries out the gamma correction of the input first, second and third primary signals using the first, second and third correction data signals selected by said first selector; and an adjustment instruction device that gives an instruction to adjust the white balance, wherein said first selector selects a plurality of different combinations of the first, second and third correction data signals corresponding respectively to the plurality of regions on the screen of said display when said adjustment instruction device gives the instruction to adjust the white balance, and said corrector corrects the input first, second and third primary signals using the plurality of different combinations of first, second and third correction data signals selected by said first selector to display the images having different white balances on said plurality of regions, respectively.

2. The white balance adjusting device according to claim 1, further comprising:

a second selector that selects any of the plurality of images displayed respectively on the plurality of regions on the screen of said display; and a controller that controls said first selector such that one combination of the first, second and third correction data signals corresponding to the image selected by said second selector is selected, wherein said corrector corrects the first, second and third primary signals to display the image on the entire screen of said display using the one combination of the first, second and third correction data signals selected by said first selector.

3. The white balance adjusting device according to claim 2, further comprising:

a readjustment instruction device that gives an instruction to readjust the white balance after the adjustment thereof, wherein said controller controls said first selector such that the image is displayed on the entire screen of said display with the white balance of the image that has been displayed on the entire screen of said display before the adjustment of the current white balance when said readjustment instruction device gives the instruction to readjust.

4. The white balance adjusting device according to claim 3, further comprising:
a holder that holds the combination of the first, second and third correction data signals corresponding to the image that has been displayed on the entire screen of said display before the adjustment of the white balance, wherein
said controller controls said first selector such that the combination of the first, second and third correction data signals held by said holder is selected when the readjustment is instructed by said readjustment instruction device.

5. The white balance adjusting device according to claim 2, wherein
said second selector includes a touch panel provided on the screen of said display.

6. A video display device comprising:
a display having a screen;
a signal processor that generates first, second and third primary signals corresponding respectively to different colors to display an image on the screen of said display; and
a white balance adjusting device that adjusts a white balance of the image displayed on the screen of said display, wherein
said white balance adjusting device includes:
a storage that stores a plurality of first correction data signals for gamma correction of the first primary signal, a plurality of second correction data signals for the gamma correction of the second primary signal and a plurality of third correction data signals for the gamma correction of the third primary signal;
a first selector that selects any of the plurality of first correction data signals, any of the plurality of second correction data signals and any of the plurality of third correction data signals stored in said storage;
a corrector that carries out the gamma correction of the first, second and third primary signals generated by said signal processor using the first, second and third correction data signals selected by said first selector; and
an adjustment instruction device that gives an instruction to adjust the white balance, and wherein
said first selector selects a plurality of different combinations of the first, second and third correction data signals corresponding respectively to a plurality of regions on the screen of said display when said adjustment instruction device gives the instruction to adjust the white balance, and wherein
said corrector corrects the first, second and third primary signals generated by said signal processor using the plurality of different combinations of the first, second and third correction data signals selected by said first selector, and
said display displays the images having different white balances on said plurality of regions, respectively, based on the first, second and third correction data signals corrected by said corrector.

7. The video display device according to said claim 6, wherein
said white balance adjusting device further comprises:
a second selector that selects any of the plurality of images displayed respectively on the plurality of regions on the screen of said display; and
a controller that controls said first selector such that one combination of the first, second and third correction data signals corresponding to the image selected by said second selector is selected, and wherein
said corrector corrects the first, second and third primary signals generated by said signal processor using the one combination of the first, second and third correction data signals selected by said first selector, and
said display displays the image on the entire screen based on the first, second and third primary signals corrected by said corrector.

8. The video display device according to claim 7, wherein
said white balance adjusting device further includes a readjustment instruction device that gives an instruction to readjust the white balance after the adjustment thereof, and
said controller controls said first selector such that the image is displayed on the entire screen of said display with the white balance of the image that has been displayed on the entire screen of said display before the adjustment of the current white balance when said readjustment instruction device gives the instruction to readjust the white balance.

9. The video display device according to claim 8, wherein
said white balance adjusting device further includes a holder that holds the combination of the first, second and third correction data signals corresponding to the image that has been displayed on the entire screen of said display before the adjustment of the white balance, and
said controller controls said first selector such that the combination of the first, second and third correction data signals held by said holder is selected when the readjustment is instructed by said readjustment instruction device.

10. The video display device according to claim 7, wherein
said second selector includes a touch panel provided on the screen of said display.

11. The video display device according to claim 6, wherein
said signal processor generates the first, second and third primary signals such that the images with same shapes are displayed on the plurality of regions on the screen of said display when said adjustment instruction device gives the instruction to adjust the white balance.

12. The video display device according to claim 6, further comprising:
a synchronizing signal generator that generates a vertical synchronizing signal and a horizontal synchronizing signal, wherein
said first selector includes,
a selecting signal generator that generates a selecting signal for selecting the plurality of regions on the screen of said display in order based on the vertical synchronizing signal and the horizontal synchronizing signal generated by said synchronizing signal generator, and
a data selector that selects the plurality of different combinations of the first, second and third correction data signals corresponding respectively to the plurality of regions on the screen of said display in order based on the selecting signal generated by said selecting signal generator.

* * * * *